United States Patent
Kim et al.

(10) Patent No.: US 10,044,079 B2
(45) Date of Patent: Aug. 7, 2018

(54) HIGH VOLTAGE BATTERY

(71) Applicant: Hyundai Motor Company, Seoul (KR)

(72) Inventors: Min Wook Kim, Gyeonggi-do (KR); Gun Goo Lee, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 177 days.

(21) Appl. No.: 14/943,457

(22) Filed: Nov. 17, 2015

(65) Prior Publication Data

US 2017/0047623 A1    Feb. 16, 2017

(30) Foreign Application Priority Data

Aug. 12, 2015 (KR) .................... 10-2015-0114024

(51) Int. Cl.
  *H01M 10/625* (2014.01)
  *H01M 10/613* (2014.01)
  *H01M 10/6551* (2014.01)
  *H01M 10/656* (2014.01)
  *H01M 2/10* (2006.01)
  (Continued)

(52) U.S. Cl.
  CPC .......... *H01M 10/625* (2015.04); *B60K 1/04* (2013.01); *H01M 2/1083* (2013.01); *H01M 10/613* (2015.04); *H01M 10/6554* (2015.04); *H01M 10/656* (2015.04); *H01M 2220/20* (2013.01)

(58) Field of Classification Search
  CPC .......... H01M 10/625; H01M 10/6551; H01M 10/656; H01M 2/1083; H01M 10/613; H01M 2220/20
  See application file for complete search history.

(56) References Cited

U.S. PATENT DOCUMENTS

2007/0238016 A1* 10/2007 Takamatsu .......... H01M 2/1077
  429/120
2012/0009455 A1* 1/2012 Yoon ................. H01M 10/6552
  429/120
(Continued)

FOREIGN PATENT DOCUMENTS

JP  2011-049139 A  3/2011
JP  2012-018915 A  1/2012
(Continued)

*Primary Examiner* — Muhammad S Siddiquee
(74) *Attorney, Agent, or Firm* — Mintz Levin Cohn Ferris Glovsky and Popeo, P.C.; Peter F. Corless

(57) ABSTRACT

A high voltage battery is provided and includes a battery module that has a plurality of battery cells and covers disposed between the battery cells and a plurality of mounting members that fix the battery module to a vehicle body. The covers absorb heat energy between the battery cells and discharge the heat energy between the mounting members. In addition, a cooling block is disposed between the mounting members and has a coolant flowing therein which exchanges heat with the battery cells. Therefore, cooling performance of the battery is improved using a water cooling structure, a height of the mounting members integrating the battery modules with each other is secured to increase structure rigidity and a height of a case of the battery is minimized, thereby improving volume energy density of the battery and preventing generation of a high voltage short-circuit even though the coolant leaks during a vehicle collision.

11 Claims, 11 Drawing Sheets

(51) Int. Cl.
    *B60K 1/04*         (2006.01)
    *H01M 10/6554*    (2014.01)

(56) References Cited

U.S. PATENT DOCUMENTS

| | | | | |
|---|---|---|---|---|
| 2012/0298433 | A1* | 11/2012 | Ohkura | H01M 2/1077 |
| | | | | 180/65.1 |
| 2014/0020763 | A1* | 1/2014 | Phlegm | H01M 10/4228 |
| | | | | 137/1 |
| 2014/0356662 | A1* | 12/2014 | Yang | H01M 10/625 |
| | | | | 429/72 |
| 2015/0171486 | A1* | 6/2015 | Rawlinson | H01M 10/482 |
| | | | | 324/426 |

FOREIGN PATENT DOCUMENTS

| | | |
|---|---|---|
| JP | 2015-069845 A | 4/2015 |
| KR | 10-2012-0029824 A | 3/2012 |
| KR | 10-2013-0106484 A | 9/2013 |
| KR | 2013-0129669 A | 11/2013 |
| KR | 10-2014-0140678 A | 12/2014 |

* cited by examiner

HIGH VOLTAGE BATTERY

CROSS-REFERENCE TO RELATED APPLICATION

This application is based on and claims the benefit of priority to Korean Patent Application No. 10-2015-0114024, filed on Aug. 12, 2015 in the Korean Intellectual Property Office, the disclosure of which is incorporated herein in its entirety by reference.

TECHNICAL FIELD

The present disclosure relates to a high voltage battery, and more particularly, to a high voltage battery that improves cooling performance using a water cooling structure, that minimizes a height of a case, and prevents generation of a high voltage short-circuit.

BACKGROUND

Generally, a battery pack for charging and supplying electricity is mounted within vehicles using the electricity as an energy source. These vehicles include a general electric vehicle that uses the electricity as the energy source and a hybrid vehicle using both of a fuel and the electricity as the energy source as well as a general vehicle. In the battery pack according to the related art mounted within the vehicle heat is generated due to a chemical change generated in a process of charging or supplying the electricity. Since the heat generated as described above may lower performance and a lifespan of the battery pack, a cooling apparatus for maintaining the battery pack in an appropriate temperature range is provided.

The cooling apparatus may be an air cooling type or a water cooling type. Recently, a battery pack managing apparatus including a thermoelectric element disposed at an upper portion of the battery pack to convert the heat of the battery pack into electricity has been developed. However, an electricity supplying apparatus for a vehicle according to the related art has a spatial limitation in installing the thermoelectric element due to wirings connected to the battery pack, other components disposed in the vicinity of the battery pack, and the like. Therefore, it may be difficult to install the thermoelectric element and connect the wirings, such that structural improvement is demanded.

In addition, in the related art, a phenomenon that the thermoelectric element disposed at the upper portion of the battery pack is separated from the battery pack due to vibrations, or the like, transferred through the vehicle, or the like, has occurred, which decreases cooling efficiency and power generation efficiency and causes an electrical short-circuit.

SUMMARY

The present disclosure provides a high voltage battery having improved cooling performance using a water cooling structure, decreased case height, and that prevents the generation of a high voltage short-circuit.

According to an exemplary embodiment of the present disclosure, a high voltage battery may include: a battery module including a plurality of battery cells and aluminum (AL) covers disposed between the plurality of battery cells; and a plurality of mounting members that fix the battery module to a vehicle body, wherein the AL covers absorb heat energy between the plurality of battery cells and discharge the heat energy between the plurality of mounting members.

Particularly, the AL covers may have an 'L' shape and may be bent from end portions of the battery cells. The battery module may include a housing which may include mounting parts coupled to the mounting members. The high voltage battery may further include a cooling block disposed between the plurality of mounting members and through which a coolant may flow and the coolant exchanges heat with the AL covers. The mounting members may be formed at a predetermined height. A case that covers an outer side of the battery module including the mounting members and the cooling block may be formed.

Further, an insulation pad for reinforcing heat insulation may be additionally disposed between a lower surface of the cooling block of the battery module and an inner surface of the case. A pair of mounting members may couple both ends of a plurality of battery modules to each other. The cooling block may be disposed below the battery module and between the pair of mounting members, thus minimizing a vertical height of the case. The AL cover may be a closed pipe in which a wick having a capillary structure is formed and gas may be included therein. The battery module may include a sensing connector disposed at a predetermined height from a lower portion thereof to prevent a high voltage short-circuit when the coolant leaks.

According to another exemplary embodiment of the present disclosure, a high voltage battery may include: a battery module having a plurality of battery cells; a plurality of mounting members that fix the battery module to a vehicle body; and a cooling block disposed between the plurality of mounting members and having a coolant flowing therein, the coolant exchanging heat with the plurality of battery cells. An exterior side of the battery module may include a housing on which mounting parts are formed, and an inner portion of the housing may include AL covers disposed between the battery cells. The cooling block may be disposed below a plurality of battery modules and between the mounting members and move the coolant to cool the plurality of battery modules. A case that covers an outer side of the battery module including the mounting members and the cooling block may be formed, and an insulation pad for reinforcing heat insulation may be additionally disposed between a lower surface of the cooling block of the battery module and an inner surface of the case.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
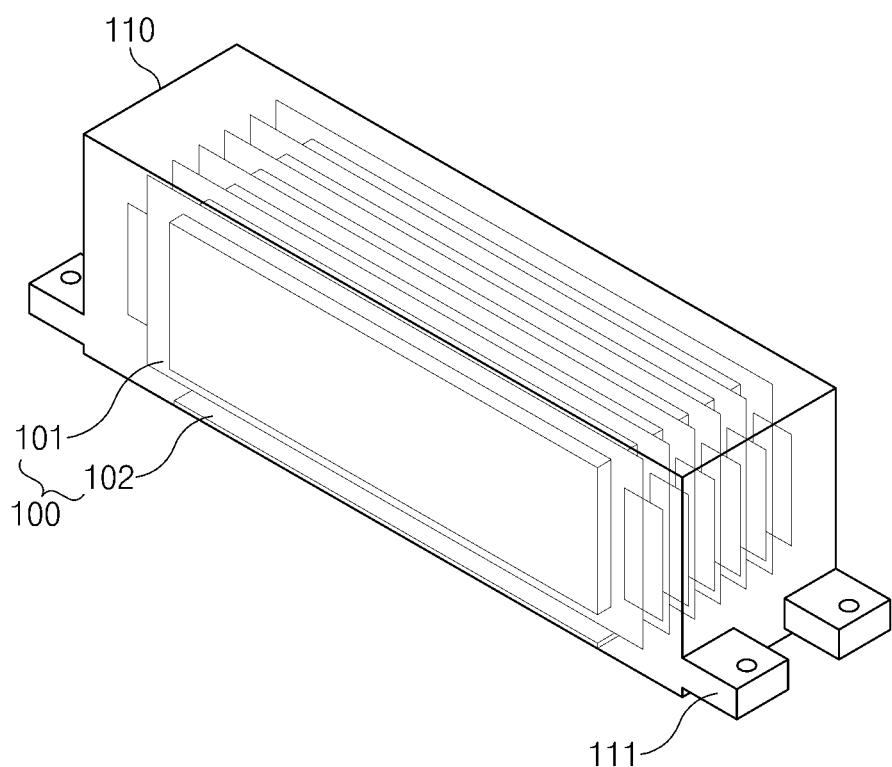
FIG. 1 is a view illustrating a battery module of a high voltage battery according to an exemplary embodiment the present disclosure.
Figure 2:
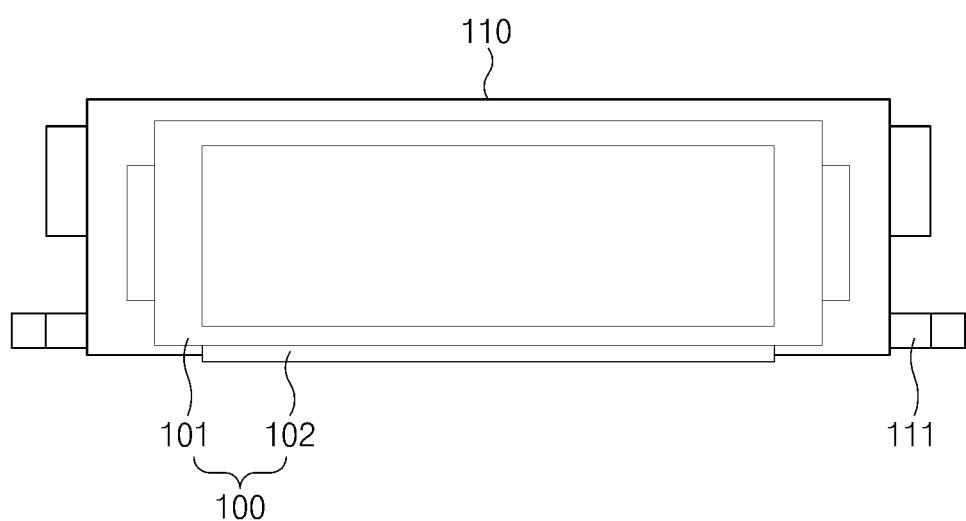
FIG. 2 is a side view illustrating the battery module of the high voltage battery according to an exemplary embodiment the present disclosure.
Figure 3:
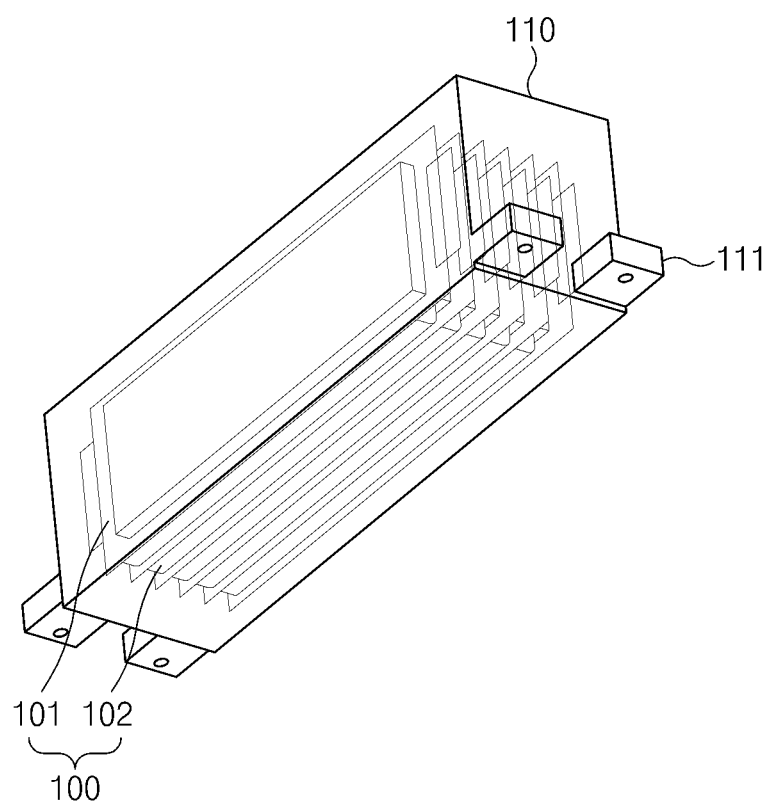
FIG. 3 is a bottom view illustrating the battery module of the high voltage battery according to an exemplary embodiment of the present disclosure.

A high voltage battery according to an exemplary embodiment of the present disclosure may include a battery module 100 in which AL covers 102 are disposed between a plurality of battery cells 101 and mounting members 120 fix the battery module 100 to a vehicle body, as illustrated in FIGS. 1 to 6. As illustrated in FIGS. 1 to 3, the battery module 100 may include the plurality of battery cells 101 and the aluminum (AL) covers 102 disposed between the plurality of battery cells 101 and the battery module 100 may be replaced with a thermal pad.

Figure 4:
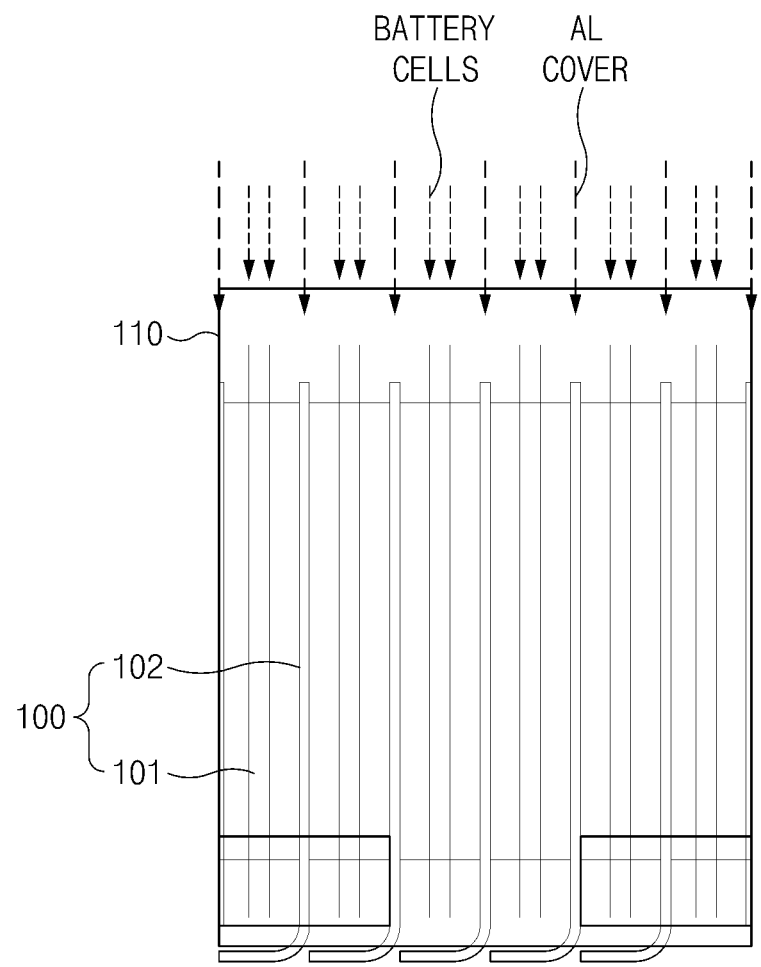
FIG. 4 is a view illustrating a battery cell and a AL cover disposed in the battery module of the high voltage battery according to an exemplary embodiment the present disclosure.
Figure 5:
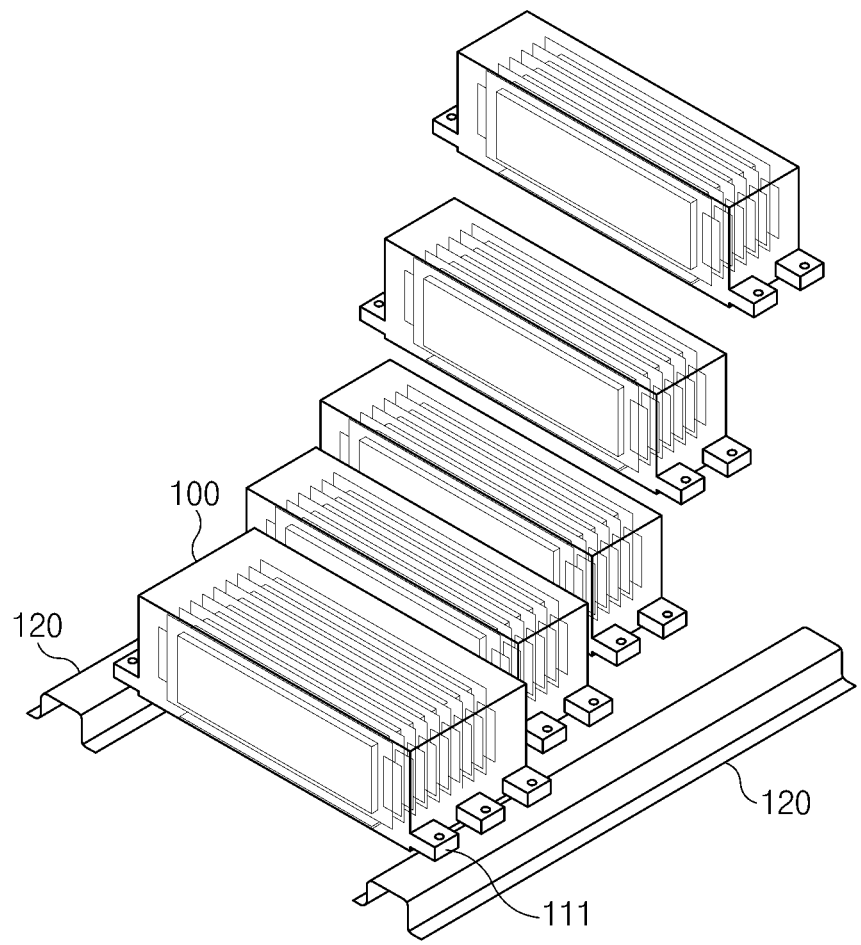
FIG. 5 is a view illustrating coupling between a plurality of battery modules and a plurality of mounting members in the high voltage battery according to an exemplary embodiment the present disclosure.
Figure 6:
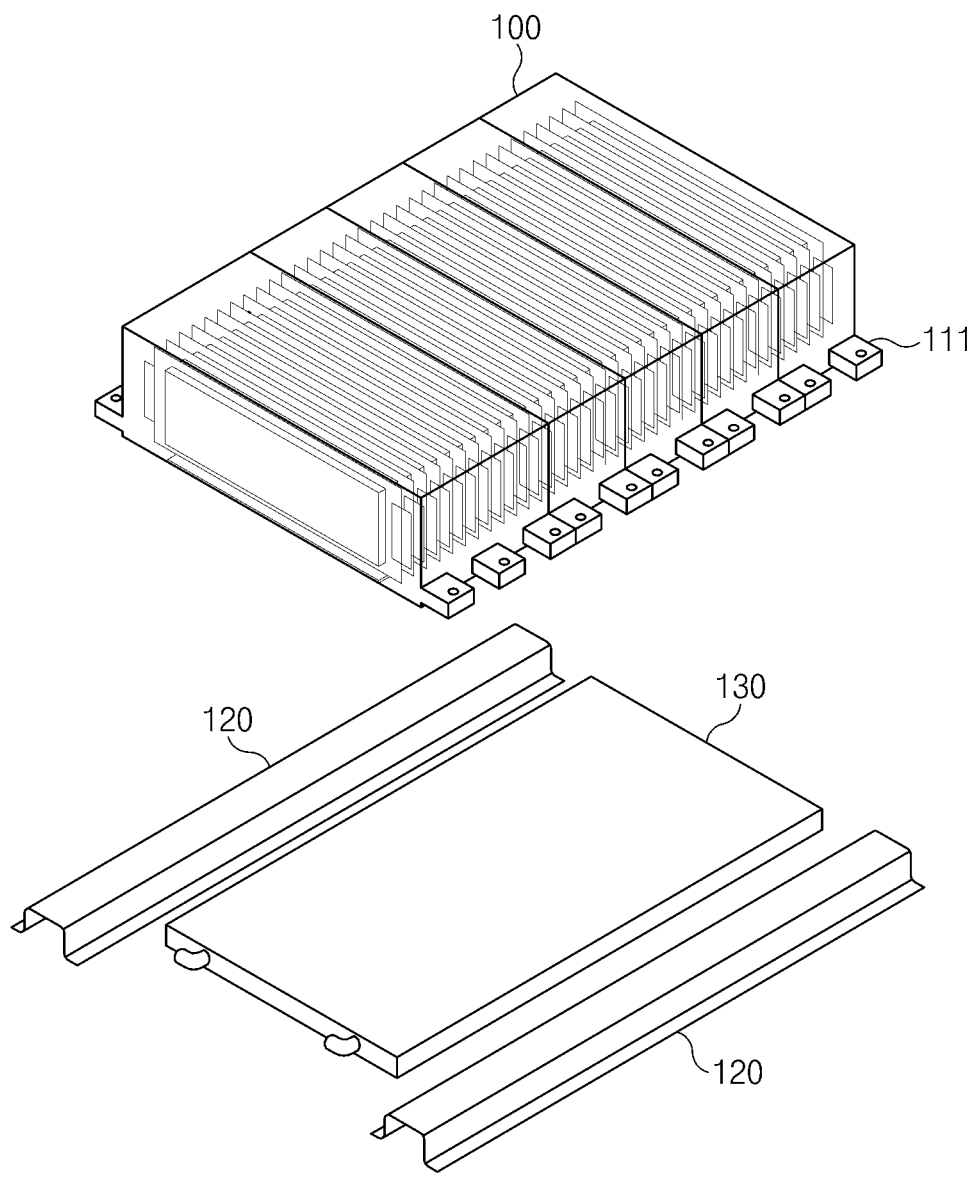
FIG. 6 is a view illustrating a state before a cooling block is coupled to the battery module and the mounting member in the high voltage battery according to an exemplary embodiment the present disclosure.
Figure 7:
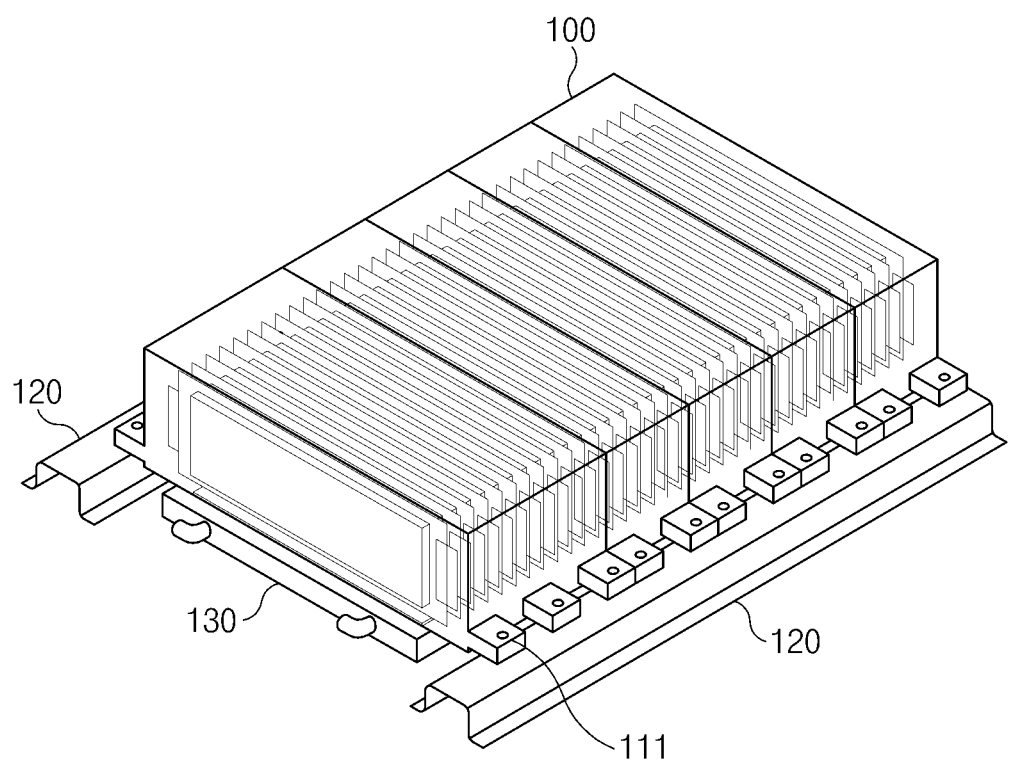
FIG. 7 is a view illustrating a state after the cooling block is coupled to the battery module and the mounting member in the high voltage battery according to an exemplary embodiment the present disclosure.

As illustrated in FIGS. 5 to 7, a plurality of mounting members 120 may fix the battery module 100 to the vehicle body. In particular, the AL covers 102 may be configured to absorb heat energy between the plurality of battery cells 101 and discharge the heat energy between the plurality of mounting members 120 to enable a heat transfer. As illustrated in FIGS. 3 and 4, the AL covers 102 may have an 'L' shape and may be bent from end portions of the battery cells 101 to absorb and discharge the heat energy. In addition, the AL cover 102 may be a closed pipe in which a wick (not illustrated) having a capillary structure is formed and gas is included therein.

As illustrated in FIGS. 1 to 3, an outer side of the battery module 100 may include a housing 110, and both ends of the housing 110 may include mounting parts 111 to couple the mounting members 120 and the battery module 100 to each other. A cooling block 130 may be disposed between the plurality of mounting members 120 and a coolant may flow therein to enable heat exchange with the AL covers 102, as illustrated in FIGS. 6 and 7.

Figure 8:
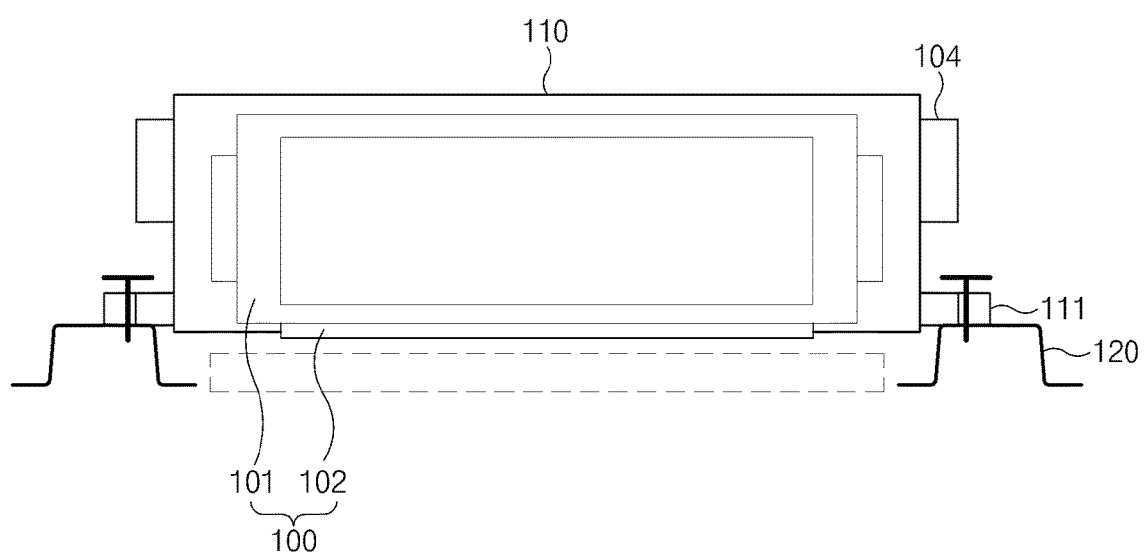
FIG. 8 is a cross-sectional view illustrating the high voltage battery according to an exemplary embodiment the present disclosure.
Figure 9:
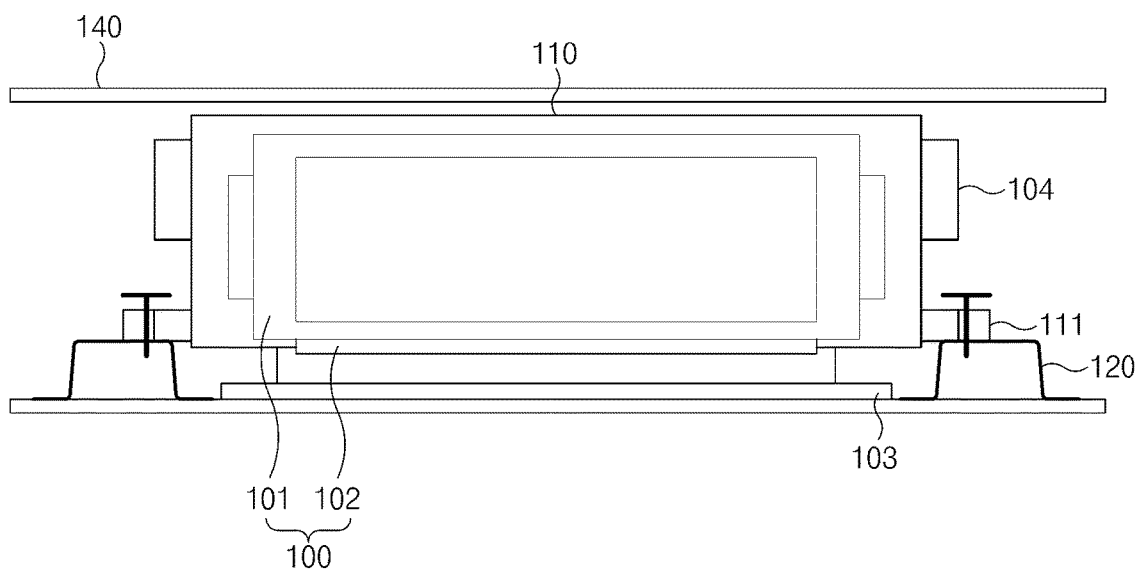
FIG. 9 is a cross-sectional view illustrating a state in which an insulation pad is disposed between the battery module and a case in the high voltage battery according to an exemplary embodiment the present disclosure.

In particular, as illustrated in FIG. 8, the mounting members 120 may be formed at a predetermined height to allow the cooling block 130 to be more stably positioned between the mounting members 120, thereby making it possible to improve structure rigidity. As illustrated in FIG. 9, a case 140 that covers the battery module 100 may be formed at an outer side of the battery module 100 including the mounting members 120 and the cooling block 130. In addition, an insulation pad 103 for reinforcing heat insulation may be additionally disposed between a lower surface of the cooling block 130 of the battery module 100 and an inner surface of the case 140 to improve efficiency at the time of heat exchange.

Figure 10:
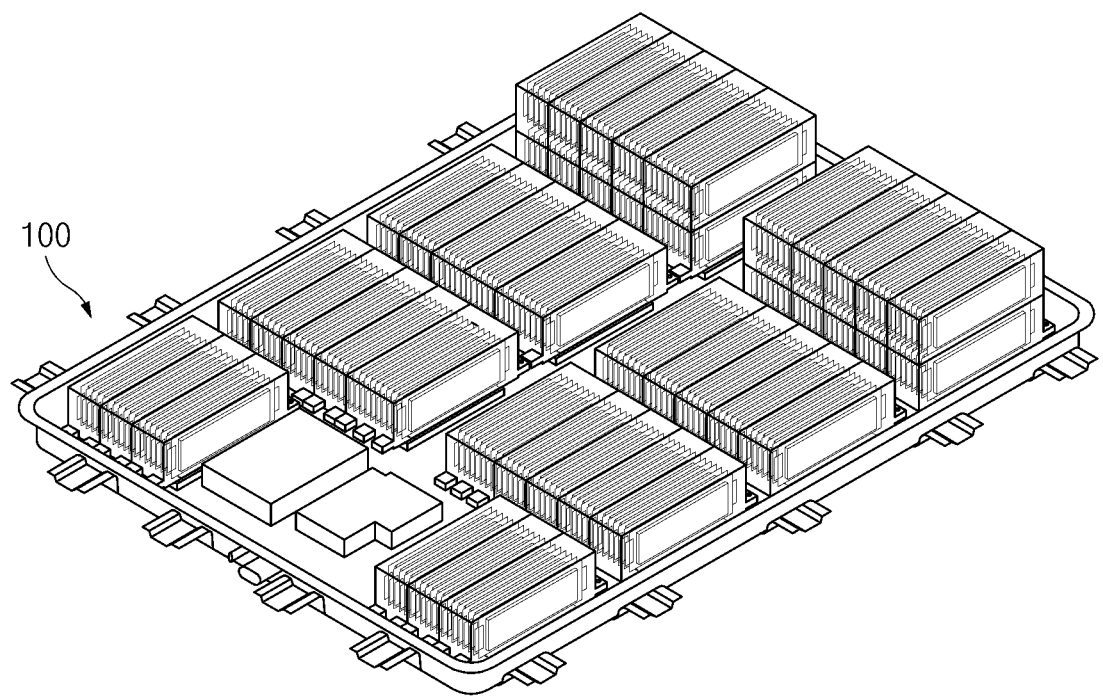
FIG. 10 is a view illustrating a high voltage battery assembly according to an exemplary embodiment the present disclosure.
Figure 11:
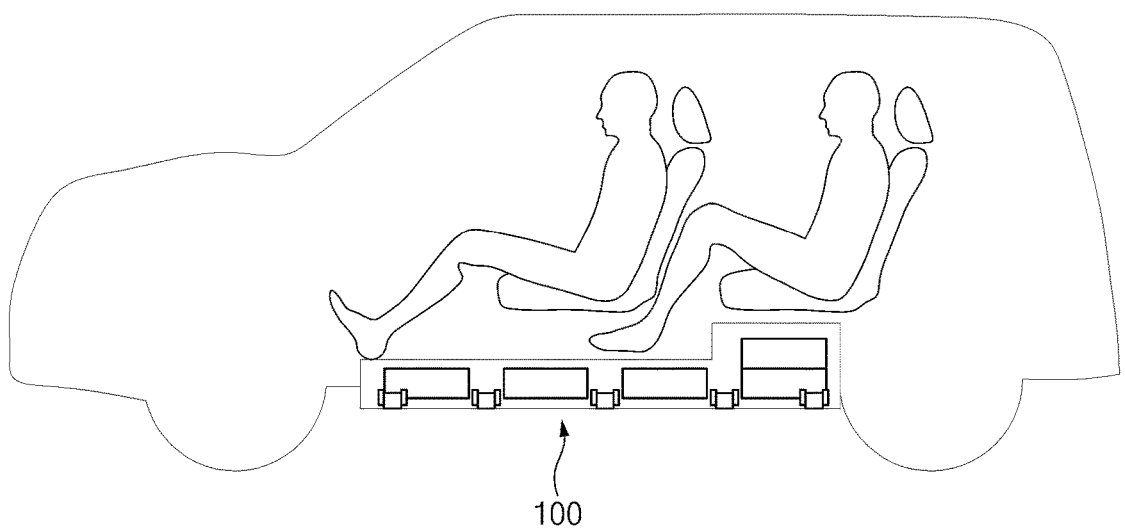
FIG. 11 is a cross-sectional view illustrating an example in which the high voltage battery according to an exemplary embodiment the present disclosure is mounted within a vehicle.

Moreover, a pair of mounting members 120 may couple both ends of a plurality of battery modules 100 to each other. As illustrated in FIGS. 8, 10, and 11, the cooling block 130 may be disposed below the battery module 100 and between the pair of mounting members 120, to minimize a vertical height of the case 140. In addition, the battery module 100 may include a sensing connector 104 disposed at a predetermined height at an outer side of the housing 110. Therefore, even though a coolant may leak during a vehicle collision, the coolant does not contact a cell terminal part, thus minimizing the risk of a high voltage short-circuit and improving stability.

A high voltage battery according to an exemplary embodiment of the present disclosure may include a battery module 100 having a plurality of battery cells 101, a plurality of mounting members 120 that fix the battery module 100 to a vehicle body, and a cooling block 130 disposed between the mounting members 120 and configured to exchange heat with the battery cells 101, as illustrated in FIGS. 1 to 7.

As illustrated in FIGS. 1 to 4, the battery module 100 may include the plurality of battery cells 101. As illustrated in FIGS. 5 to 7, the plurality of mounting members 120 may fix both ends of the battery module 100 to the vehicle body. As illustrated in FIGS. 6 to 9, the cooling block 130 may be disposed between the plurality of mounting members 120 and enables heat exchange with the plurality of battery cells 101 through a flow of a coolant. In particular, an outer side of the battery module 100 may include a housing 110 on which mounting parts 111 are formed and an inner portion of the housing 110 may include AL covers 102 disposed between the battery cells 101.

The AL covers 102 may be configured to absorb heat energy between the plurality of battery cells 101 and discharge the heat energy between the plurality of mounting members 120 to enable a heat transfer. In addition, the cooling block 130 may be disposed below a plurality of battery modules 100 and between the mounting members 120 and may be configured to move the coolant to enable the plurality of battery modules 100 to be cooled. Meanwhile, a case 140 that covers an outer side of the battery module 100 having the mounting members 120 and the cooling block 130 may be formed, and an insulation pad 103 for reinforcing heat insulation may be additionally disposed between a lower surface of the cooling block 130 of the battery module 100 and an inner surface of the case 140 to improve efficiency during heat exchange. Further, the cooling block 130 may be disposed below the battery module 100 and between the mounting members 120, to minimize a vertical height of the case 140.

As described above, the high voltage battery according to an exemplary embodiment of the present disclosure may include the battery module 100 having the plurality of battery cells 101 and the AL covers 102 disposed between the plurality of battery cells 101; and the plurality of mounting members 120 that fix the battery module 100 to the vehicle body, wherein the AL covers 102 may be configured to absorb the heat energy between the plurality of battery cells 101 and discharge the heat energy between the plurality of mounting members 120. In addition, the cooling block 130 may be disposed between the plurality of mounting members 120 and may have the coolant flowing therein, the coolant maybe configured to exchange the heat with the plurality of battery cells 101. Therefore, cooling performance of the high voltage battery may be improved using a water cooling structure, a height of the mounting members 120 integrating the battery modules 100 with each other may be secured to increase structure rigidity and minimize a height of the case 140 of the high voltage battery, thereby improving volume energy density of the high voltage battery and preventing the generation of the high voltage short-circuit even though the coolant leaks during a vehicle to secure stability against the collision.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A high voltage battery, comprising:
    a battery module having a plurality of battery cells and aluminum covers disposed between the plurality of battery cells;
    a plurality of mounting members that fix the battery module to a vehicle body;
    a cooling block disposed between the plurality of mounting members and having a coolant flowing therein; and
    a case that covers an outer side of the battery module having the mounting members and the cooling block,
    wherein the aluminum covers absorb heat energy between the plurality of battery cells and discharge the heat energy between the plurality of mounting members,
    wherein the coolant exchanges heat with the covers, and
    wherein the cooling block is disposed below the battery module and between the pair of mounting members to minimize a vertical height of the case.

2. The high voltage battery according to claim 1, wherein the covers have an 'L' shape and are bent from end portions of the battery cells.

3. The high voltage battery according to claim 1, wherein the battery module includes a housing and the housing includes mounting parts coupled to the mounting members.

4. The high voltage battery according to claim 1, wherein the mounting members are formed at a predetermined height.

5. The high voltage battery according to claim 1, wherein an insulation pad for reinforcing heat insulation is disposed between a lower surface of the cooling block of the battery module and an inner surface of the case.

6. The high voltage battery according to claim 1, wherein a pair of mounting members couple both ends of a plurality of battery modules to each other.

7. The high voltage battery according to claim 1, wherein each cover is a closed pipe in which a wick having a capillary structure is formed and gas is included therein.

8. The high voltage battery according to claim 6, wherein the battery module includes:
    a sensing connector disposed at a predetermined height from a lower portion thereof to prevent a high voltage short-circuit when the coolant leaks.

9. A high voltage battery, comprising:
    a battery module having a plurality of battery cells;
    a plurality of mounting members that fix the battery module to a vehicle body;
    a cooling block disposed between the plurality of mounting members and having a coolant flowing therein; and
    a case that covers an outer side of the battery module having the mounting members and the cooling block,
    wherein the coolant exchanges heat with the plurality of battery cells,
    wherein the cooling block is disposed below a plurality of battery modules and between the mounting members and moves the coolant to cool the plurality of battery modules, and
    wherein the cooling block is disposed below the battery module and between the pair of mounting members to minimize a vertical height of the case.

10. The high voltage battery according to claim 9, wherein an outer side of the battery module includes a housing on which mounting parts are formed, and an inner portion of the housing includes covers disposed between the battery cells.

11. The high voltage battery according to claim 9, further comprising:
    an insulation pad for reinforcing heat insulation disposed between a lower surface of the cooling block of the battery module and an inner surface of the case.

* * * * *